United States Patent [19]

Young

[11] Patent Number: 4,794,361

[45] Date of Patent: Dec. 27, 1988

[54] COIL WINDING METHOD FOR MAXIMUM UTILIZATION OF WINDING ENVELOPE

[75] Inventor: Carl E. Young, LaGrange, Ill.

[73] Assignee: General Motors Corporation, Detroit, Mich.

[21] Appl. No.: 166,477

[22] Filed: Mar. 10, 1988

[51] Int. Cl.[4] .................. H01F 27/28; H01F 41/06
[52] U.S. Cl. .................................... 336/189; 29/605;
   242/158 R; 310/208; 336/222
[58] Field of Search ............... 310/206, 207, 208, 194,
   310/180; 335/213, 299; 29/602 R, 605;
   336/189, 190, 191, 222, 225; 242/7.02, 7.07,
   7.09, 158 R, 7.14, 7.15, 7.16

[56] References Cited

U.S. PATENT DOCUMENTS 2,930,014  3/1960  Van Der Hook et al. ......... 336/190

Primary Examiner—Thomas J. Kozma
Attorney, Agent, or Firm—Mark A. Navarre

[57] ABSTRACT

A coil winding method wherein only one-half turn is wound in the bottom slot of the first layer of the coil. This results in the loss of one-half turn, but causes the normal crossover from the first layer to the second layer to occur on the side of the coil opposite the lead-end. The last one-half turn of the second layer wound in the bottom slot of the first layer, thereby recovering the lost one-half turn. Additional turns are added in this manner until approximately one-half of the layers have been wound. Thereafter, the usual progressive winding method is employed. As a result, crossover related build-up in the completed coil is distributed between opposite sides of the coil and the number of turns within the allowable profile is substantially maximized.

3 Claims, 3 Drawing Sheets

COIL WINDING METHOD FOR MAXIMUM UTILIZATION OF WINDING ENVELOPE

This invention relates to the manufacture of a motor field or like coil, and more particularly to a winding method for maximizing the number of winding turns within a limited coil envelope.

BACKGROUND OF THE INVENTION

Conventionally, motor field coils are manufactured using the progressive winding technique illustrated in FIGS. 1a–1c hereof. A complete coil turn is placed in each slot along the axis of the coil form, see FIG. 1a. After the first layer of turns is completed, the turns are advanced radially outward to begin a second substantially concentric layer, as illustrated in FIG. 1b. In so doing, the first turn of the second layer must cross over the last turn of the first layer at an angle. Such a crossing is referred to herein as a normal crossover. In like manner, a second normal crossover occurs after the second layer is completed, and the next turn is advanced radially outward to begin the third layer, as illustrated in FIG. 1c. Thus, there is one normal crossover for each new layer of coil turns.

A problem which occurs in any multi-concentric layer coil is that the normal crossovers create a bulge in the coil profile. This is particularly problematical with the progressive winding technique described above because all of the normal crossovers occur on one side (the lead-end side) of the coil. This creates a build-up or bulge in the coil profile which significantly limits the number of turns that can be wound within the permissible coil envelope.

To overcome the build-up problem referred to above, it is known to employ a retrogressive winding technique in which one-half turn in every other layer of the coil is omitted. This results in normal crossovers which occur on alternate sides of the coil, thereby distributing the build-up between the lead-end side of the coil and the opposite side of the coil. This permits more turns to be wound within the permissible coil envelope but still leaves unoccupied spaces in the coil where the half turns were omitted. In other words, the retrogressive method improves the copper utilization of the coil but falls short of maximizing the copper utilization.

SUMMARY OF THE PRESENT INVENTION

The present invention is directed to a winding method which distributes crossover-related build-up while substantially maximizing the copper utilization of the coil. According to the winding method of this invention, only one-half turn is wound in the bottom slot of the first layer of the coil. This results in the loss of one-half turn but causes the normal crossover from the first layer to the second layer to occur on the side of the coil opposite the lead ends. The last one-half turn of the second layer wound in the bottom slot of the first layer, thereby recovering the lost one-half turn. This is referred to herein as a reverse crossover since the wire is crossing from the second layer to the first layer; such crossover does not create a bulge and therefore does not contribute to winding build-up.

The next one and one-half turns are also placed in the bottom slot, effectively resulting in a momentary crossover to the third layer of the coil opposite the lead-end side of the coil. Thus, each turn following a reverse crossover creates a normal crossover bulge opposite the lead-end side of the coil.

Additional turns are added as described above until approximately one-half of the coil layers have been wound. The remaining coil turns are wound using the progressive winding technique referred to above, thereby causing the remaining normal crossovers to occur on the lead-end side of the coil. As a result, the crossovers which contribute to winding build-up (normal crossovers) are distributed between opposite sides of the coil. Since no turns are skipped, the copper utilization of the coil is substantially maximized.

BRIEF DESCRIPTION OF THE DRAWINGS

FIG. 4 is an elevation view; FIG. 5 is a cross section taken along lines 5—5 in FIG. 4, featuring the finishing lead-end; and FIG. 6 is a cross section taken along lines 6—6 in FIG. 4, featuring the starting lead-end.

DETAILED DESCRIPTION OF THE DRAWINGS

Figure 4:
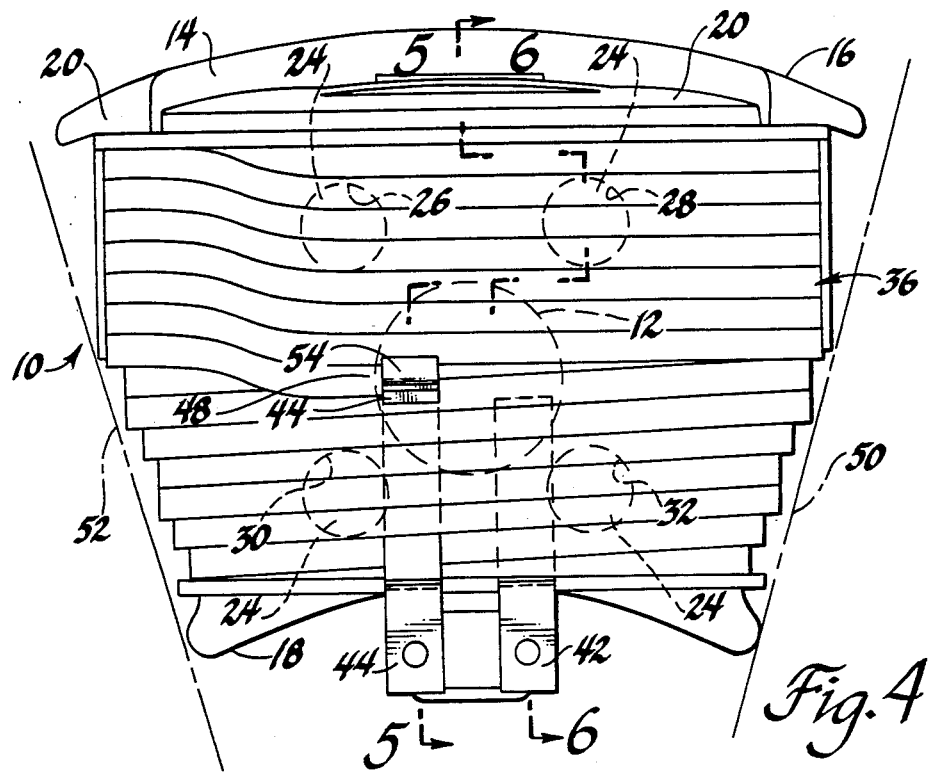
FIGS. 4–6 depict the lead-end of a motor field coil wound according to this invention.
Figure 5:
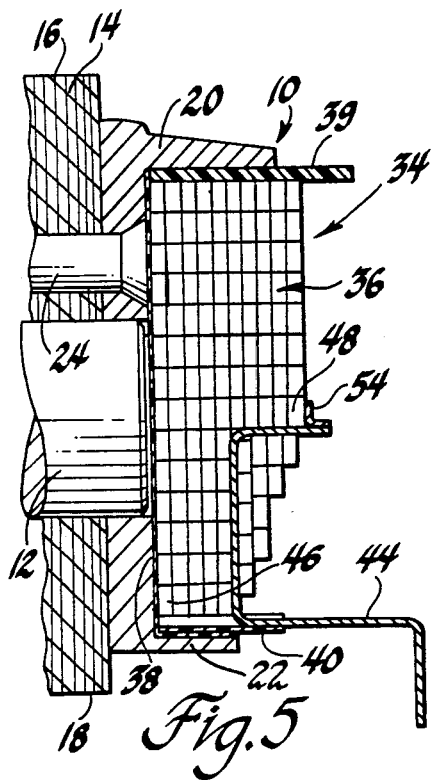
Figure 6:
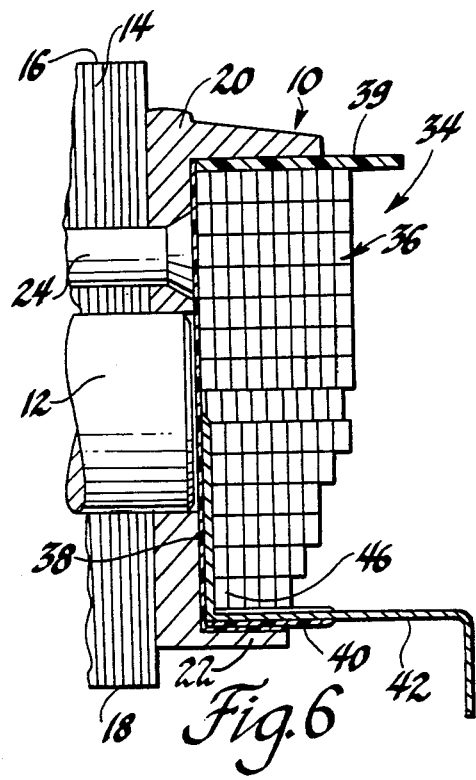

Referring first to FIGS. 4–6, the reference numeral 10 generally designates a field coil wound according to this invention. The coil 10 is assembled around a solid cylindrical core piece 12 which is adapted to be bolted to the rotor of a dynamoelectric machine upon completion of the coil assembly and a laminated core piece 14 disposed thereabout. The laminated core piece 14 has a pole face 16 formed on its radially outward end and a rotor mating face 18 formed on its radially inward end.

A pair of pole end pieces 20, 22 are mutually secured to opposite ends of the laminated core piece 14 by rivet fasteners 24 passing through the laminae openings 26–32. The elements 20, 22 serve to retain the laminae of the core piece 14 and to form, with the laminations, a recess 34 in which the coil turns 36 are wound. Insulation between the recess 34 and the coil turns 36 is provided by strip insulation 38 and a pair of insulated washers 39, 40. The lower washer 40 is slotted as indicated to receive a pair of insulated (wrapped) coil leads 42, 44.

The coil winding procedure is started by brazing or otherwise electrically connecting the end 46 of the first coil turn to the coil lead 42. The wire is then wound around the core pieces 12, 14 within the recess 34 as described below. At some point, the coil lead 44 is placed in the recess as seen in FIG. 5 and thereafter is retained by the subsequently wound coil turns. The permissible profile dimension for the coil 10 is represented by the broken lines 50, 52. When the last turn within the permissible profile has been wound, the end 48 thereof is brazed or otherwise electrically connected to the coil lead 44 via the strap 54.

Figure 2A:
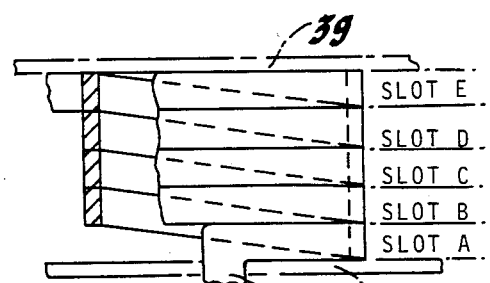
FIGS. 2a–2c illustrate the coil winding method of this invention.
Figure 2B:
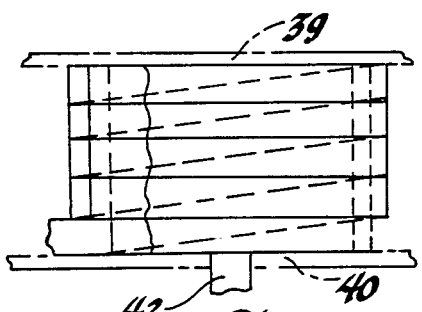
Figure 2C:
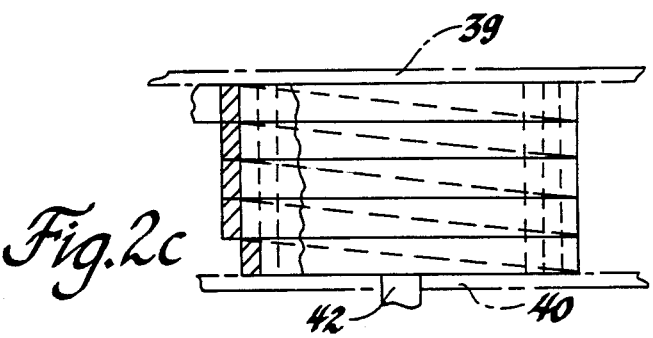

FIGS. 2a–2c schematically depict the coil 10, as viewed from the lead-end side, and are provided to illustrate the winding method of this invention. For simplicity, the depicted coils have only five slots (SLOT A through SLOT E) per layer. The washers 39, 40 and the coil lead 42 are designated as in FIGS. 4–6.

According to the winding method of this invention, only one-half turn is wound in the bottom (starting) SLOT A of the first layer of the coil, as seen in FIG. 2a. In other words, the first turn begins in SLOT A and ends in SLOT B, leaving one-half of SLOT A vacant. To contrast, an entire turn is placed in SLOT A when the conventional progressive method is employed. The remaining turns of the first layer are then successively wound, one stacked atop the other as shown. At four and one-half turns, a normal crossover from the first layer to the second layer occurs on the side of the coil opposite the coil lead 42. The winding then proceeds from top to bottom as shown in FIG. 2b to fill in the second layer. However, the last or bottom one-half turn is placed in SLOT A of the first layer. This entails a crossover from the second layer to the first layer, referred to herein as a reverse crossover.

The next one-half turn is also placed in SLOT A but returns to the second layer. This is not a normal crossover as defined herein, since the turn does not cross other turns at an angle. Rather, the turn is merely stacked on top of the first turn in the same slot and therefore does not contribute to winding build-up.

The next one-half turn is also placed in SLOT A, resulting in a crossover from the second layer to the third layer, as seen in FIG. 2c. The first half of such turn must crossover two previously wound turns on the opposite side of the coil, effectively resulting in a momentary crossover to the third layer of the coil. Since this creates a bulge, it counts as a normal crossover. The last half of such turn ends up in the third layer of the coil as seen in FIG. 2c. However, such half turn is placed directly on top of the preceding turn and there is no bulge on the lead-end side of the coil. Thus, each turn following a reverse crossover creates a normal crossover bulge opposite the lead-end side of the coil.

Additional turns are added, as described above, until approximately one-half of the coil layers have been wound. The remaining coil turns are wound using the progressive winding technique, thereby causing the remaining normal crossovers to occur on the lead-end side of the coil. As a result, the crossovers which contribute to winding build-up (normal crossovers) are distributed between opposite sides of the coil. Since no turns are skipped, the copper utilization of the coil is substantially maximized.

Figure 3:
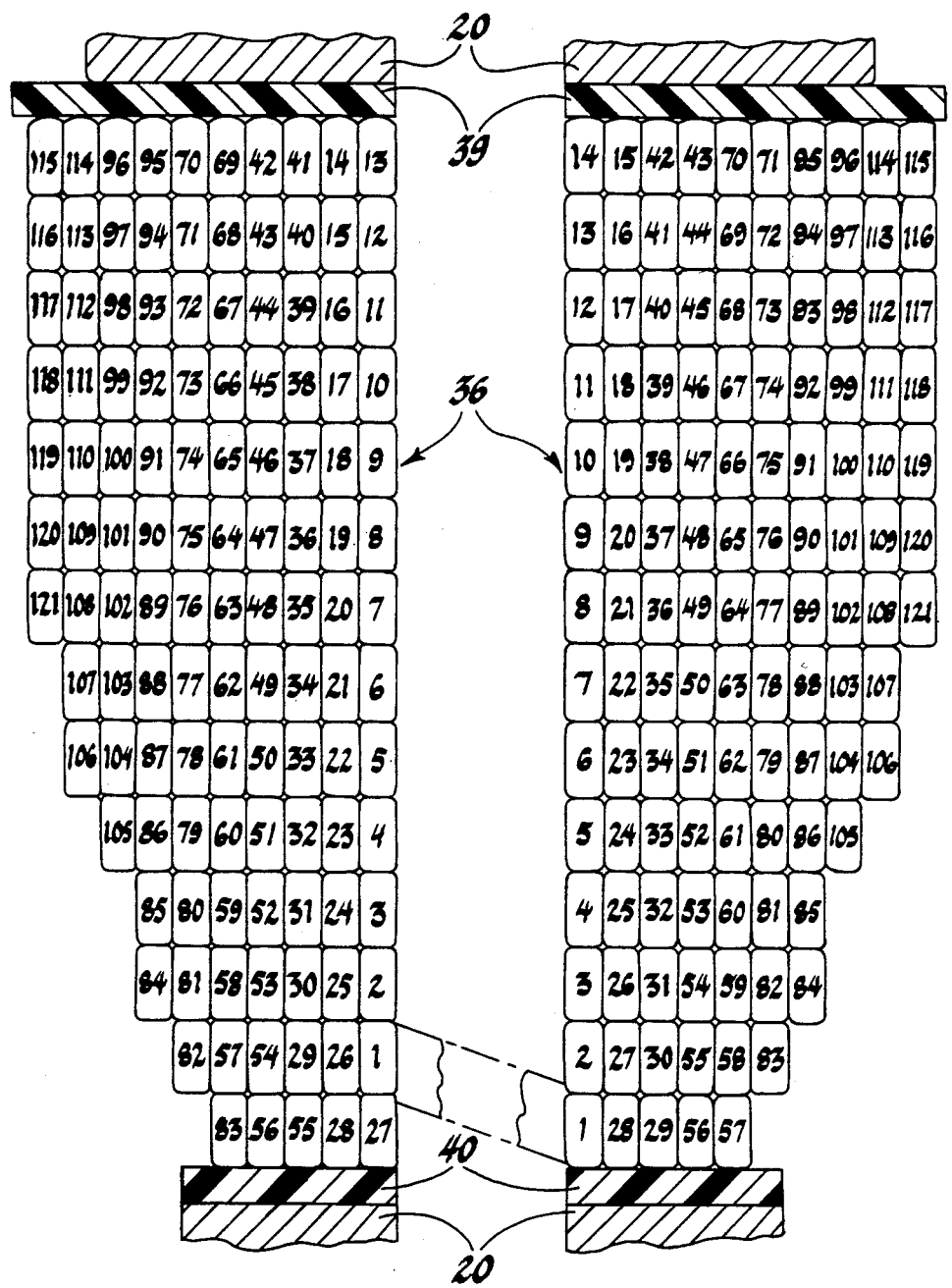
FIG. 3 shows a coil wound according to this invention in which various turns are numbered to illustrate the subject winding method.

A completed field coil wound in accordance with this invention is depicted in section in FIG. 3, the various coil elements being identified by the same reference numerals as in FIGS. 4-6. The coil has one hundred twenty-one (121) turns wound in ten (10) layers, the turns being numbered according to the order in which they are wound. The turns shown on the righthand side of the coil point into the drawing; and the turns shown on the lefthand side of the coil point out of the paper.

Figure 1A:
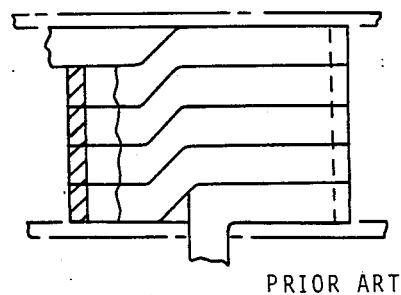
FIGS. 1a–1c illustrate a conventional progressive coil winding technique.
Figure 1B:
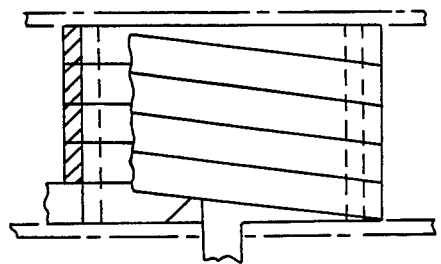
Figure 1C:
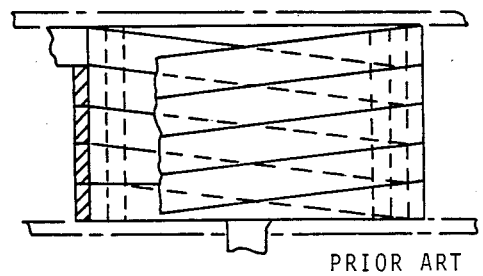

As indicated by the turn numbers, the first five layers of the coil (turns 1 through 83) are wound employing the reverse crossover winding technique of this invention. At such point, there is a double normal crossover on the lead-end side of the coil from the first (bottom) slot, fifth layer to the third slot, seventh layer. Thereafter, beginning with turn eighty-four, the progressive winding technique illustrated in FIGS. 1a-1c is employed. This is seen in FIG. 3 by the fact that both half-turns are placed in the same third slot. In the finished coil, the lead-end side has four normal crossovers: 5-7, 7-8, 8-9 and 9-10. The opposite side has three normal crossovers: 1-2, 2-3-2, 3-4, 4-5-4 and 5-6.

In the manner described above, the coil winding method of this invention provides improved copper utilization within a given winding envelope. The crossovers are distributed between the lead-end and opposite sides of the coil and the turns occupy substantially all of the area within the coil recess.

While this invention has been described in reference to the illustrated embodiment, it will be understood that various modifications will occur to those skilled in the art, and that methods incorporating such modifications may fall within the scope of this invention, which is defined by the appended claims.

The embodiments of the invention in which an exclusive property or privilege is claimed are defined as follows:

1. A method of winding a coil on a coil form, where the coil is defined by substantially concentric layers of coil turns, each such layer being defined by a plurality of coil turns placed in successive slots along the axis of the coil form, said method comprising the steps of:

winding a plurality of coil turns using a first winding technique in which approximately one-half of the starting slot of the first layer defined by such turns is initially left vacant, and thereafter filled by a coil turn from a subsequently wound layer defined by such turns, thereby to define a first group of coil layers in which coil turn crossings that cause a bulge in the coil profile occur on a first end of the coil; and winding a plurality of coil turns using a second winding technique in which an entire coil turn is placed in the starting slot of the first layer defined by such turns, thereby to define a first group of coil layers in which coil turn crossings that cause a bulge in the coil profile occur on a second end of the coil opposite said first end.

2. The method set forth in claim 1, wherein the number of layers in said first and second groups of coil layers is substantially equal, thereby to substantially equally distribute such bulge-causing coil turn crossings between said first and second ends of the coil.

3. A coil of conductive turns wound in substantially concentric layers about a coil form, each such layer being defined by a plurality of coil turns placed in successive slots along the axis of the coil form, the improvement wherein:

the coil comprises four or more layers;

at least two of said layers are wound such that one-half of the starting slot of the first of said two layers is initially left vacant, and thereafter filled by a coil turn from the second of said two layers, whereby crossings of the coil turns between such two layers which result in a bulge in the coil profile occur on a first end of the coil; and the remaining layers are wound such that a complete coil turn is placed in the starting slot of the first such remaining layer, whereby crossings of the coil turns between such remaining layers which result in a bulge in the coil profile occur on a second end of the coil opposite said first end.

* * * * *